United States Patent [19]

Braeger et al.

[11] Patent Number: 5,779,531
[45] Date of Patent: Jul. 14, 1998

[54] MACHINE FOR REMOVING A SURFACE LAYER FROM FISH FILLETS

[75] Inventors: Horst Braeger, Lübeck; Michael Jürs, Stockelsdorf, both of Germany

[73] Assignee: Nordischer Maschininbau Rud. Baader GmbH & Co. KG, Lubeck, Germany

[21] Appl. No.: 813,952

[22] Filed: Mar. 3, 1997

[30] Foreign Application Priority Data

Mar. 4, 1996 [DE] Germany .................. 96103327

[51] Int. Cl.[6] ............................................. A22C 5/16
[52] U.S. Cl. ............................................. 452/127
[58] Field of Search ............................. 452/127, 125

[56] References Cited

U.S. PATENT DOCUMENTS

| | | |
|---|---|---|
| 2,173,336 | 9/1939 | Lamere et al. . |
| 2,645,812 | 7/1953 | Jensen . |
| 2,681,675 | 6/1954 | Burch ................................. 452/127 |
| 2,738,545 | 3/1956 | Stevenson et al. . |
| 3,249,139 | 5/1966 | Runnells, Jr. et al. . |
| 4,340,995 | 7/1982 | Braeger ............................. 452/127 |

FOREIGN PATENT DOCUMENTS

| | | |
|---|---|---|
| 178370 | 1/1985 | European Pat. Off. . |
| 267131 | 10/1987 | European Pat. Off. . |
| 305550 | 10/1987 | European Pat. Off. . |
| 2380737 | 2/1977 | France . |
| 2481636 | 11/1981 | France ............................... 452/127 |
| 2517932 | 12/1991 | France . |
| 2 254 284 | 6/1972 | Germany . |
| 43 29 380 | 1/1993 | Germany . |

*Primary Examiner*—Willis Little
*Attorney, Agent, or Firm*—Fay,Sharpe,Beall,Fagan,Minnich & McKee

[57] ABSTRACT

The invention concerns an apparatus for removing a surface layer from fish fillets. To permit the apparatus to operate with high precision and optimal yield for a large variety of fish species it comprises an entrainer roller which serves as a conveying surface and a pressing shoe having a pressing surface spaced from the outer surface of the entrainer roller by a gap. The pressing shoe comprises a guide for an endless belt knife. Pressing means in the form of a plurality of driven pressing rollers are arranged in an area directly above the cutting edge of the knife to act on the knife as the fish fillets are processed. The pressing rollers are mounted to rotate with two degrees of freedom thus permitting them to exert pressure with maximum surface possible and reliably flatten the fish prior to its arrival at the belt knife.

10 Claims, 1 Drawing Sheet

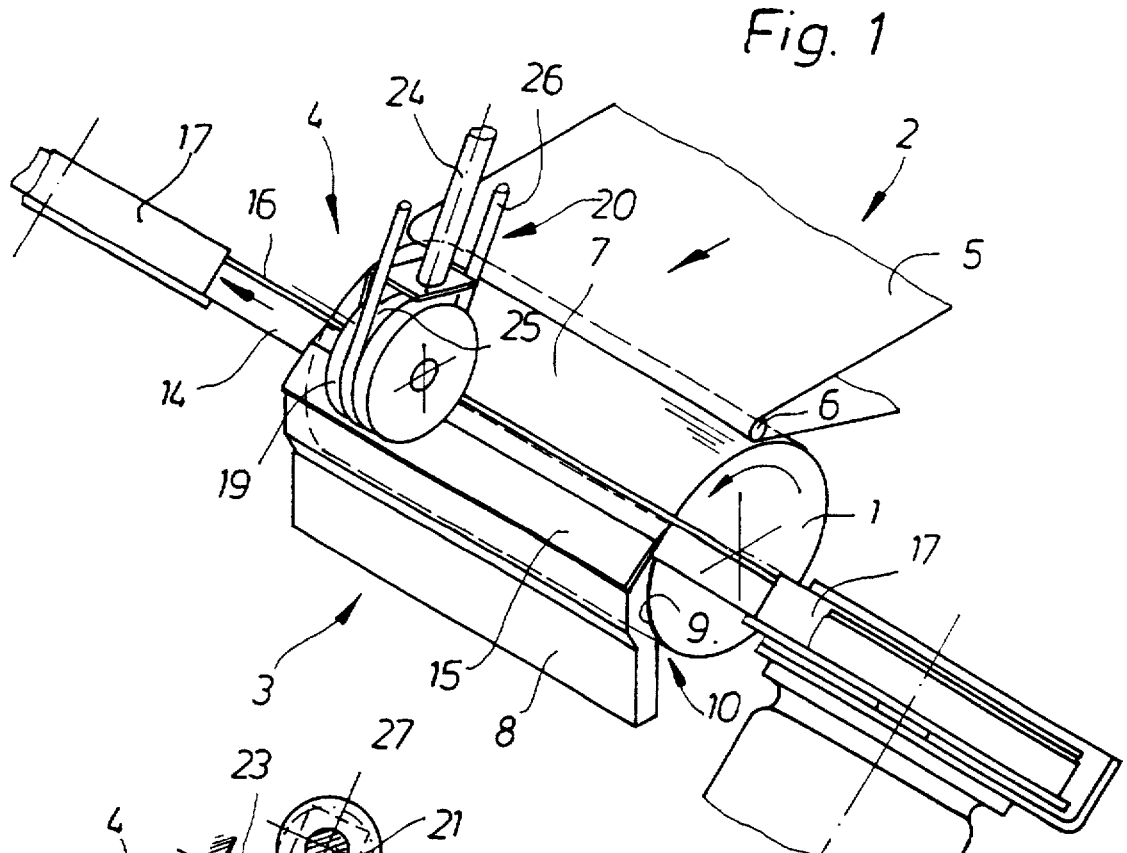
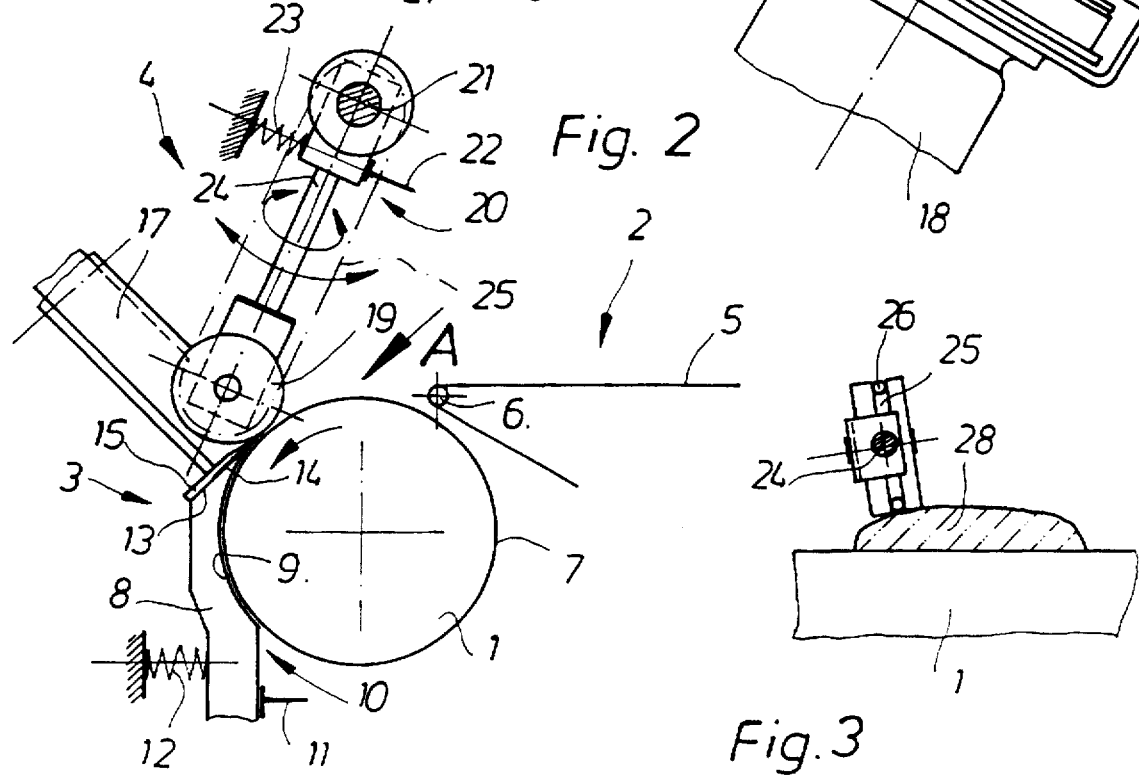

MACHINE FOR REMOVING A SURFACE LAYER FROM FISH FILLETS

BACKGROUND OF THE INVENTION

1. Field of the Invention

The invention concerns an apparatus for removing a surface layer from fillets, specifically fish fillets, the machine comprising a conveying surface for the fillets, a driven knife having a cutting edge spaced from the conveying surface and pressing means acting in the region of the cutting edge for pressing the fillets against the conveying surface.

2. Prior Art

Apparatus of this kind having diverse designs are known in practice, and serve to separate a defined layer from the fish fillets, for example so as to remove the skin or a layer of flesh, so ridding the fish fillet of unwanted components such as fat and/or discoloured layers. In such apparatus it is important that the resulting product is free of patches of skin or general blemishes or defects with the utmost certainty while the machine cuts as economically as possible so that, depending on the particular application, the so-called 'silver lining' remains on the fillet or an undesired layer may be removed from the fillet.

In general the processor strives to have available a machine which is capable of processing fillets of fish of as many as possible species with the same precision, i.e. for processing both flat fish and round fish. This aim is associated with fundamental difficulties and the corresponding problems have to date not been satisfactorily solved by the prior art. The reason for this is due specifically to the fact that different fish types require different handling. For example, the skin of flat fish is firmly connected to the fillet meat and can be removed only with a very sharp cutting edge. In contrast to this the membranes attaching the skin of round fish to the fillet meat is generally much weaker so that the best processing results have conventionally been attained by using a stationary and relatively blunt knife, which cleaves the the skin from the meat rather than cutting it. Because such a blunt knife will always follow the path of lowest resistance, the skin can be economically separated without risk either that the skin will be punctured and remain partly on the fillet meat or that the knife will follow a path through the meat resulting in wastage. However, for this very reason such a machine is clearly unsuitable for slicing off a desired superficial layer located below the skin.

In order to retain a sufficiently sharp edge in the first-mentioned case, the most appropriate machines are preferably those which work with a moving cutting edge. Only machines of this type are capable of cutting away a surface layer which is not naturally or anatomically defined, such as the skin of flat fish or any superficial layer, machines having belt knives being the most suitable. However, the quality of the cutting result of such machines when processing either flat fish or round fish depends very much on the fillet being reliably guided through the cutting process while lying in as flat and smooth position as possible.

A fillet splitting and skinning machine of the type described above is known from U.S. Pat. No. 2,645,812 in which a conveyor belt is guided by a small diameter deflection roller, a belt knife being arranged in the region of the deflection roller and a pressing belt being arranged above the belt knife. The pressing belt is held pressed down in front of the belt knife by means of closely spaced metal discs which are individually resiliently biased under gravity.

With this machine it is not possible to achieve a smooth flattening of the fillets before they reach the belt knife because of the large diameter of the metal discs. Furthermore the use of a conveyor belt as a support surface in the cutting region does not permit the desired cutting precision to be attained. Consequently, if remaining patches of skin or blemishes on the skinned fillet are to be avoided, the spacing between the belt knife and the conveyor belt must be selected such that a thicker layer is removed from the fillet than necessary or desired.

Furthermore, a disc cutting machine for skinning fillets is known from U.S. Pat. No. 2,173,336. The fillet is advanced lying on a conveyor belt towards a belt knife located to oppose the supporting surface. A pressing roller consisting of soft rubber and wrapped by an endless pressing belt is arranged directly in front of the knife cutting edge. However, the desired cutting result is not achievable with this apparatus either, because neither the arrangement of the belt knife above the wire grid belt serving as a conveyor belt nor the undefined positioning of the fillet by the pressing belt and pressing roller ensure that the fillets are fed to the belt knife in a totally flat condition.

Finally, a skinning machine for fish fillets is known from U.S. Pat. No. 2,738,545 which uses a grid belt as a supporting surface for the fish fillets and a belt knife located to oppose the grid belt. A pressing apparatus comprising a row of individually resiliently biased grooved discs arranged side by side acts directly in front of the cutting edge and above the same. Each ribbed disc guides a retaining belt in the form of a V-belt which transmits the pressure to the fish fillet. This apparatus is also not suitable for obtaining the desired cut precision for the same reasons as mentioned above. This is also true for a skinning machine disclosed in DE-AS-2 254 284, which uses several resiliently biased lamellae or plates as pressing means, which act on the fillet through a flexible skirt shortly before the fillet reaches the belt knife.

3. Objects of the Invention

It is thus a general object of the present invention to improve the known fillet splitting and skinning machines.

It is a particular object of the present invention to provide a machine which is universally applicable, i.e. capable of skinning the fillet while leaving the silver skin on the fillet meat as well as of removing a desired superficial layer.

It is another essential object of the present invention to provide a machine which operates with high precision to produce a quality product with high yield.

It is a yet further important object of the invention to provide an apparatus for removing the skin or a superficial layer from fish fillets which is capable of reliably ensuring the optimal smooth positioning and corresponding spreading of fish fillets before these reaching the knife edge.

4. Summary of the Invention

In an apparatus for removing a surface layer from fish fillets comprising a conveying surface for advancing the fillets, a driven knife having a cutting edge guided spaced from said conveying surface and pressing means acting in the area of said cutting edge to press the fillets against said conveying surface, these objects are achieved in that the conveying surface is at least partially formed by the outer surface of an entrainer roller, the knife comprises an endless knife, guided in a knife guide which is disposed in a pressing element having a pressing surface directed towards, and spaced by a gap from, said surface of said entrainer roller, and the pressing means comprise a plurality of pressing rollers, which are at least partially driven to rotate and adapted to be displaceable with at least two degrees of freedom in relation to said entrainer roller surface.

With an apparatus of this kind it is possible to remove the skin or a superficial layer from the fillets of fish of practically all commonly processed species in a precise and economic manner. This result is due to the particular combination of claimed features and specifically to the arrangement of the conveying surface below the belt knife which guarantees a constant spacing to the cutting edge of the belt knife within a small tolerance, to the fact that the pressing surface of the pressing means ensures the safe and rapid conveyance of the fillet and that the driven pressing means exert not even the slightest breaking force thereon. On the contrary, they posivitely convey the fillet and at the same time, thanks to the rotation in two degrees of freedom, act on the fillets in such a way as to guarantee an extremely effective smoothing while ensuring that the fillets are reliably presented to the belt knife in a flattened condition.

In this regard, it should be appreciated that the cooperation of the features according to the invention ensures that the skin of the fillet, and therefore the fillet itself, adopts an absolutely smooth, full contact position on the entrainer roller. This is essential if cutting results of a constant quality are to be ensured with a moving knife which actively cuts the fillet rather than splitting it, and if remaining patches of skin or blemishes, due to the uneven positioning of the fillet and as a result of the constant distance between the knife edge and conveying surface, are to be reliably avoided.

In addition to the pivotal arrangement of the pressing rollers and their driven movement, these measures can be further supported in a preferred embodiment of the invention by driving the entraining roller at a peripheral speed which is higher than the speed of the feed device. As result of this difference in speed, the fillets are stretched immediately on transfer to the entrainer roller. In further advantageous embodiments of the invention the pressing rollers and/or the pressing element can be resiliently biased towards the knife, the pressing rollers may be displaceable with respect to the surface of the entrainer roller, a free entrainer surface may be provided between the fillet transfer point and its pull-in point into the gap which comprises at least 45° of the entrainer roller circumference and the entrainer surface adjacent the belt knife can be inclined at an angle of at least 45° to the horizontal to make full use of the gravitational forces on the tip of the fillet and so facilitate its pull-in into the gap. Also, the pressing rollers can be arranged with a special type of double pivotal mounting.

Following the main object of achieving the desired universal applicability with belt knife machines, the invention, when designed with the above-mentioned features, ensures that the fillet lies extremely smooth and completely spread because the high cutting power of the drawing cut prevent the knife from determining its own direction as is the case with conventional skinning machines with stationary knives. Therefore a virtually "universal fillets" will be created, which can be processed in the same position and alignment and with the same degree of flatness irrespective of its consistency, external shape or the length of its leading tip.

BRIEF DESCRIPTION OF THE DRAWINGS

Further objects of the present invention will be apparent from the following description and claims and are illustrated in the accompanying drawings which schematically show a preferred embodiment of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings:

FIG. 1 shows an axonometric partial view of the apparatus according to the invention in simplified representation.

FIG. 2 shows a detailed side view of the apparatus according to the invention

FIG. 3 shows a partial view of the apparatus according to the invention seen in the direction of the arrow A of FIG. 2

DETAILED DESCRIPTION OF THE DRAWINGS

FIG. 1 shows a driven entrainer roller 1, a feed apparatus 2 arranged upstream of the entrainer roller, a cutting device 3 and pressing means 4 arranged in the non-shown frame of a fillet splitting and skinning machine for fish fillets.

The feed device 2 comprises an endless conveyor belt 5 which is guided around deflection or idle rollers, of which only the downwardly deflecting roller 6 is shown. The conveyor belt 5 is driven with a peripheral speed that is lower than that of the entrainer roller 1.

The outer surface 7 of the entrainer roller 1 is provided in a known manner with longitudinal grooves to increase its gripping hold. The cutting device 3 is arranged adjacent the roller surface 7 in the latter's downwardly moving area, preferably at a distance of an arch of at least 45° from the culmination point of the entrainer roller 1. The cutting device 3 comprises a pressing shoe 8 having a pressing surface 9 which is spaced from the roller surface 7 by a gap 10. The gap 10 is preferably dimensioned such that it is smaller at the inflow side of the pressing shoe 9 than at the outflow side. As indicated in FIG. 2, the movement of the pressing shoe 8 is limited by an adjustable stop 11 and resiliently biased by means of a spring 12 towards the roller surface 7. The back of the pressing shoe 8 comprises a rear face 13 which forms an acute angle with the upper end area of the pressing surface 9. The rear face 13 forms part of a guide which, in combination with a knife guide 15, forms a guide for a belt knife 14. The belt knife 14 is guided such that its cutting edge 16 extends from its guide into the direction of rotation of the entrainer roller 1. The belt knife 14 is further guided by means of two deflection discs 17, which are arranged in the non-shown frame outside the working area, one of which is mounted on the shaft of a motor 18. The knife 14 is arranged such that it defines a cutting plane of at least 45° relative to the plane of the feed apparatus 2.

The pressing means 4 are arranged in an area directly above the cutting edge 16 of the belt knife 14. The pressing means 4 comprise several pressing rollers 19, of which only one is illustrated for reasons of clarity. Each pressing roller 19 is mounted at the distal end of a pivot arm 20, respectively, the proximal end of the arm 20 being pivotally mounted about a fixed axle 21 which extends in parallel to the axis of the entrainer roller 1. Each pivot lever 20 is further supported by an adjustable stop member 22 and biased towards the entrainer roller 1 by means of a spring 23. The proximal and distal end portions of each pivot arm 20 are rotatably connected to one another by means of a shaft 24 which extends in the axial direction of the pivot arm such that the distal end portion is freely rotatable with respect to the proximal end portion (FIG. 3). In this manner, the surface of each roller can be adjusted through two degrees of freedom. Each pressing roller 19 is provided with a groove 25, in which a driving belt 26 for driving the pressing roller 19 is guided, and is formed with a gripping or non-slip outer surface. The pressing roller is driven by means of a groove pulley 27 fixed to the axle 21 which is formed as a driving shaft and which, as described above, serves as a pivot axle for the pivot arm 20. The groove pulley 27 imparts a peripheral speed to the pressing roller 19 which is slightly higher than that of the entrainer roller 1. The operation of the machine is described below. A fish fillet 28 to be processed is laid on the conveyor belt 5 skin-side down and generally with its tail-end leading, and advanced. The fish fillet is thus transferred to the higher speed surface 7 of the entrainer roller 1 and is consequently stretched. The entrainer roller 1 then guides the fillet 28 towards the cutting device 3 which is spaced at a certain distance, preferably defined by at least 45° of the circumference of the entrainer roller, from the transfer point so that the fish fillet has time to become properly settled in position on the surface 7 before reaching the cutting apparatus 3. It is also preferable that the tangent of the entrainer roller surface 7 directly adjacent the cutting device 3 is inclined at at least 45° to the horizontal so that the tip of the fillet naturally falls into the gap 10 between the outer surface 7 and the pressing surface 9 of the pressing shoe 8 under the influence of gravity. Shortly before reaching the cutting apparatus 3, the fillet end comes under the pressing rollers 19 of the pressing means 4 so that the pressing rollers run onto the inner surface of the fillet. By virtue of the higher peripheral speed of the pressing rollers and the pressure generated by the spring 23, the fillet is then actively pressed against the outer surface 7 of the entrainer roller 1 and any braking effect on the fillet by the pressing means will be avoided. The outer fillet layer to be removed thus arrives under the cutting edge 16 of the belt knife 14 and is finally forced into the gap 10 between the outer surface 7 and the pressing surface 9 of the pressing shoe 8 partly under the influence of gravity as a result of the 45° offset position. At this point in time, the separated layer will be progressively pulled into the gap 10 as the fillet advances while the desired part of the fillet 28 is pushed over the knife guides 15 by means of the pressing rollers 19. The resilient biasing of the pressing shoe 8 results in the cut performed by the knife belt 14 being automatically adapted to the skin thickness so that the fillet is skinned in a highly economic manner. Throughout this process, each pressing roller 19 turns about its associated rotational shaft such that it lies on the fillet with the largest possible surface area. This results in the optimal promotion of the conveyance and positioning of the fish.

We claim:

1. An apparatus for removing a surface layer from fish fillets comprising a conveying surface for advancing the fillets, driven knife means having a cutting edge guided spaced from said conveying surface and pressing means acting in the area of said cutting edge to press the fillets against said conveying surface, wherein said conveying surface is at least partially formed by a part of the outer surface of an entrainer roller and defines a point of transfer at which the fillets are first engaged by said surface, said knife means comprises an endless knife, guided in a knife guide which is disposed in a pressing element having a pressing surface directed towards, and spaced by a gap from, said surface of said entrainer roller, and said pressing means comprise a plurality of rotating pressing rollers, which are at least in part driven to rotate and which are adapted to be displaceable with at least two degrees of freedom with respect to said entrainer roller surface.

2. An apparatus as claimed in claim 1, wherein said pressing rollers are resiliently biased towards said entrainer roller.

3. An apparatus as claimed in claim 1, wherein each said pressing roller is driven to rotate.

4. An apparatus as claimed in claim 1, wherein each pressing roller comprises an axis of rotation, which lies essentially parallel to the axis of rotation of said entrainer roller.

5. An apparatus as claimed in claim 1, wherein each pressing roller is mounted on a distal end of a pivot arm, a proximal end of said pivot arm being mounted for rotation on a fixed axle extending essentially parallel to an axis of rotation of said entrainer roller.

6. An apparatus as claimed in claim 5, wherein said distal end of said pivot arm is mounted to rotate with respect to said proximal end on a shaft extending in the longitudinal direction of said pivot arm.

7. An apparatus as claimed in claim 1, wherein feeding means for advancing the fillets are arranged upstream of said entrainer roller, the speed of said feeding means being lower than the peripheral speed of said entrainer roller.

8. An apparatus as claimed in claim 1, wherein said pressing element is adjustable to define the dimensions of said gap and is resiliently biased towards said entrainer roller.

9. An apparatus as claimed in claim 1 wherein said belt knife defines a cutting plane which is inclined at an angle of at least 45° to the tangent of said surface of said entrainer roller at a point at which the fillets engage said outer surface of said entrainer roller.

10. An apparatus as claimed in claim 1, wherein said cutting edge of said belt knife is arranged spaced by an arch of at least 45° from a point of transfer of said fillets onto said outer surface of said entrainer roller.

* * * * *